United States Patent
Vercier

(10) Patent No.: US 9,983,314 B2
(45) Date of Patent: May 29, 2018

(54) SYSTEM FOR EXCLUDING A FAILURE OF A SATELLITE IN A GNSS SYSTEM

(71) Applicant: Thales, Courbevoie (FR)

(72) Inventor: Nicolas Vercier, Valence (FR)

(73) Assignee: Thales, Courbevoie (FR)

( * ) Notice: Subject to any disclaimer, the term of this patent is extended or adjusted under 35 U.S.C. 154(b) by 259 days.

(21) Appl. No.: 14/859,639

(22) Filed: Sep. 21, 2015

(65) Prior Publication Data
US 2016/0084962 A1    Mar. 24, 2016

(30) Foreign Application Priority Data

Sep. 22, 2014 (FR) .................................. 14 02113

(51) Int. Cl.
G01S 19/20 (2010.01)
G01S 19/49 (2010.01)

(52) U.S. Cl.
CPC ............... G01S 19/20 (2013.01); *G01S 19/49* (2013.01)

(58) Field of Classification Search
CPC ...................................................... G01S 19/20
See application file for complete search history.

(56) References Cited

U.S. PATENT DOCUMENTS

| | | | | |
|---|---|---|---|---|
| 2004/0239560 A1* | 12/2004 | Coatantiec | .............. | G01S 19/20 342/357.62 |
| 2010/0026567 A1* | 2/2010 | Coatantiec | .............. | G01S 19/20 342/357.62 |
| 2012/0013505 A1* | 1/2012 | Vourc'h | .................. | G01S 19/20 342/357.58 |

FOREIGN PATENT DOCUMENTS

WO    2010/108938 A1    9/2010

OTHER PUBLICATIONS

Faurie, F., "Algorithmes de Contrôle d'Intégrité Pour la Navigation Hybride GNSS et Systèmes de Navigation Inertielle en Présence de Multiples Mesures Satellitaires Défaillantes," Thesis, University of Bordeaux, 243 pages, 2011.

(Continued)

*Primary Examiner* — Bernarr E Gregory
*Assistant Examiner* — Fred H Mull
(74) *Attorney, Agent, or Firm* — Davis Wright Tremaine LLP; Michael J. Donohue

(57) ABSTRACT

The invention proposes a system for excluding a failure of a satellite suitable for a hybrid navigation system and which operates even in case of degraded geometry of the constellation of satellites. The hybrid system according to the invention comprises a plurality M of hybridization filters ($SFH_1$, . . . $SFH_M$) each receiving at least one satellite positioning measurement (MPS) carried out on the signals received from all the satellites in visibility of the said system and an inertial positioning measurement (MPI) and delivering a corrected positioning measurement, the so-called hybrid measurement ($MH_{S1}$, . . . $MH_{SM}$), the hybridization filters being updated, at a constant temporal rate, successively at periodically shifted temporal instants.

11 Claims, 4 Drawing Sheets

(56) References Cited

OTHER PUBLICATIONS

Young, R.S.Y., and G.A. McGraw, "Fault Detection and Exclusion Using Normalized Solution Separation and Residual Monitoring Methods," Navigation: Journal of The Institute of Navigation 50(3):151-169, Fall 2003.

French Written Opinion and Search Report dated Jul. 16, 2015, in French Application No. 14/02113, filed Sep. 22, 2015, 9 pages.

* cited by examiner

SYSTEM FOR EXCLUDING A FAILURE OF A SATELLITE IN A GNSS SYSTEM

BACKGROUND OF THE INVENTION

Field of the Invention

The invention relates to the field of navigation systems based on the utilization of signals transmitted by several satellites of a so-called GNSS constellation, the acronym standing for "Global Navigation Satellite System".

The invention relates more precisely to hybrid navigation systems based both on a satellite-based positioning system and on the information provided by an inertial unit.

The invention pertains to a system for excluding a failure of a satellite integrated within such a navigation system so as to exclude the measurements carried out on the signal transmitted by the satellite identified as having failed.

Description of the Related Art

A satellite-based positioning receiver provides information about the position and speed of the carrier by triangulation on the basis of the signals transmitted by flyby satellites visible from the carrier. The information provided may be momentarily unavailable since the receiver must have a minimum of four satellites of the positioning system in direct view in order to be able to take a fix. Said information is furthermore of variable precision, dependent on the geometry of the constellation on which the triangulation is based, and noisy since it is reliant on the reception of signals of very low levels originating from distant satellites having low transmission power. But said information does not suffer from long-term drift, the positions of the satellites flying in their orbits being known precisely over the long term. The noise and the errors may be related to the satellite systems, to the receiver or to the propagation of the signal between the satellite transmitter and the receiver of GNSS signals. Furthermore, the satellite data may be erroneous as a consequence of faults affecting the satellites. These spoiled data must then be flagged so as not to falsify the position arising from the GNSS receiver.

To preclude satellite faults and ensure the integrity of GNSS measurements, it is known to equip a satellite-based positioning receiver with a so-called RAIM ("Receiver Autonomous Integrity Monitoring") precision and availability estimation system which is based on the geometry and the redundancy of the constellation of satellites used during triangulation and on the short-term foreseeable evolution of this geometry deduced from the knowledge of the trajectories of the satellites. However, the RAIM algorithm is used only for pure satellite location systems and not for hybrid location systems.

Furthermore, in the case where the geometry of the GNSS constellation exhibits certain particular configurations, the RAIM system allows exclusion of the defective satellite only once the positioning error has attained a high value, this not being compatible with a navigation system embedded on board a carrier which requires positioning information in real time with high precision.

Finally, in order to be able to operate, the RAIM algorithm requires at least 6 satellites in visibility of the receiver, this not necessarily being the case.

SUMMARY OF THE INVENTION

The invention proposes a system for excluding a failure of a satellite suitable for a hybrid navigation system and which operates even in case of degraded geometry of the constellation of satellites.

The subject of the invention is, in a first embodiment, a system for excluding a failed satellite measurement in a satellite-based positioning system, the said system comprising:

A plurality N of first hybridization filters each receiving at least one satellite positioning measurement carried out on the signals received from all the satellites in visibility of the said system with the exception of one satellite, different for each different first hybridization filter, and an inertial positioning measurement and delivering a corrected positioning measurement, the so-called hybrid measurement, a plurality M of second hybridization filters each receiving at least one satellite positioning measurement carried out on the signals received from all the satellites in visibility of the said system and an inertial positioning measurement and delivering a corrected positioning measurement, the so-called hybrid measurement, the second hybridization filters being updated, at a constant temporal rate, successively at periodically shifted temporal instants, a detection module able to deliver an instant of detection of a failure of at least one satellite positioning measurement, an exclusion module for excluding a failed satellite positioning measurement, configured to:
select the oldest hybrid measurement, with respect to the instant of detection of a failure, from among the M hybrid measurements to date delivered by the M second hybridization filters,
compare the selected hybrid measurement, the so-called reference hybrid measurement, with each of the hybrid measurements delivered by the N first hybridization filters,
deduce therefrom the identification of the failed measurement.

According to a particular aspect of the first embodiment of the invention, the said module for excluding a failure of a satellite is furthermore configured to:
Compare the difference between the reference hybrid measurement and each of the hybrid measurements delivered by the N first hybridization filters with a predetermined detection threshold,
Conclude on the presence of a failed measurement from among the group of N−1 measurements used by the first hybridization filters which satisfy the aforementioned comparison test,
Identify the failed measurement as that belonging to the intersection of the groups of N−1 measurements comprising a failed measurement.

According to another particular aspect of the first embodiment of the invention, the said module for excluding a failure of a satellite is furthermore configured to:
apply a statistical test of the "RAIM" type to a set of measurements comprising the satellite measurements carried out on the signals received from all the satellites in visibility with the exception of one satellite, the statistical test being dependent on the error between each measurement of the said set and an estimate of each of these measurements,
detect the presence of a failed satellite measurement from among the satellite measurements of the said set as a function of the said statistical test,
inject, as input to the M second hybridization filters, by priority the satellite measurements not belonging to a set in which the presence of a failed measurement has been detected.

According to another particular aspect of the first embodiment of the invention, the updating period of a first hybridization filter is less than the updating period of a second hybridization filter.

The subject of the invention is also, in a second embodiment, a system for excluding a failed satellite measurement in a satellite-based positioning system, the said system comprising:

a plurality M of hybridization filters each receiving at least one measurement carried out on the signals received from all the satellites in visibility of the said system and an inertial positioning measurement and delivering a corrected positioning measurement, the so-called hybrid measurement, the said hybridization filters being updated, at a constant temporal rate, successively at periodically shifted temporal instants, a detection module able to deliver an instant of detection of a failure of at least one satellite positioning measurement, a module for excluding a failed satellite positioning measurement, configured to:

select the hybrid measurement, called the reference hybrid measurement, which is the oldest with respect to the instant of detection of a failure, from among the M hybrid measurements to date delivered by the M hybridization filters, apply a statistical test of the "RAIM" type to a set of measurements comprising on the one hand the satellite measurements carried out on the signals received from all the satellites in visibility with the exception of one satellite and on the other hand the reference hybrid measurement, the statistical test being dependent on the error between each measurement of the said set and an estimate of each of these measurements, detect the presence of a defective satellite measurement from among the satellite measurements of the said set as a function of the said statistical test, repeat the previous two steps while modifying at each repetition the satellite measurement excluded from the said set, deduce therefrom the identification of the defective satellite measurement.

According to a particular aspect of the second embodiment of the invention, the said statistical test consists at least in:

Forming a system of equations linking on the one hand the satellite measurements of the said set to the coordinates of the position of the system and on the other hand the reference hybrid measurement to the coordinates of the position of the system, Constructing a vector of residuals by applying the least squares algorithm to the said system of equations, Constructing a single residual on the basis of the said vector of residuals, Comparing the single residual with a predetermined detection threshold.

According to a particular aspect of the second embodiment of the invention, the reference hybrid measurement comprises a position measurement of the system and a measurement of clock bias between a satellite and the said system.

According to a particular aspect of the second embodiment of the invention, the set of measurements to which the statistical test is applied furthermore comprises the measurement noise impacting the reference hybrid measurement, which is provided by the hybridization filter that delivered the said hybrid measurement.

According to a particular aspect of the second embodiment of the invention, the said module for excluding a failure of a satellite is furthermore configured to:

apply a statistical test of the "RAIM" type to a set of measurements comprising the satellite measurements carried out on the signals received from all the satellites in visibility with the exception of one satellite, the statistical test being dependent on the error between each measurement of the said set and an estimate of each of these measurements, detect the presence of a defective satellite measurement from among the satellite measurements of the said set as a function of the said statistical test, inject, as input to the M hybridization filters, by priority the satellite measurements not belonging to a set in which the presence of a defective measurement has been detected.

According to a particular aspect of either one of the two embodiments of the invention, the duration between two successive temporal instants of updating of two distinct second hybridization filters is substantially equal to the updating period of a second hybridization filter divided by the number M of second hybridization filters.

According to a particular aspect of either one of the two embodiments of the invention, a hybridization filter is a Kalman filter.

The subject of the invention is also a navigation system comprising a satellite-based positioning receiver able to deliver measurements of pseudo-distances or of positioning on the basis of signals transmitted by satellites belonging to a constellation of a satellite-based positioning system, an inertial unit able to deliver inertial positioning measurements and a system for excluding a failed satellite measurement in a satellite-based positioning system according to the invention.

BRIEF DESCRIPTION OF THE SEVERAL VIEWS OF THE DRAWINGS

Other characteristics and advantages of the present invention will become more apparent on reading the description which follows in relation to the appended drawings which represent.

DETAILED DESCRIPTION OF THE INVENTION

The present disclosure is directed to techniques for eliminating measurements based on signals transmitted from a failed satellite in a Global Navigation Satellite System (GNSS) constellation. Those skilled in the art will appreciate that the term GNSS refers generically to satellite-based navigation systems and that the present disclosure is applicable to all such systems, including, but not limited to, Galileo, GPS, NAVSTAR, GLONASS, QZSS, Beidou Global Navigation, and other regional satellite-based navigation systems.

Figure 1:
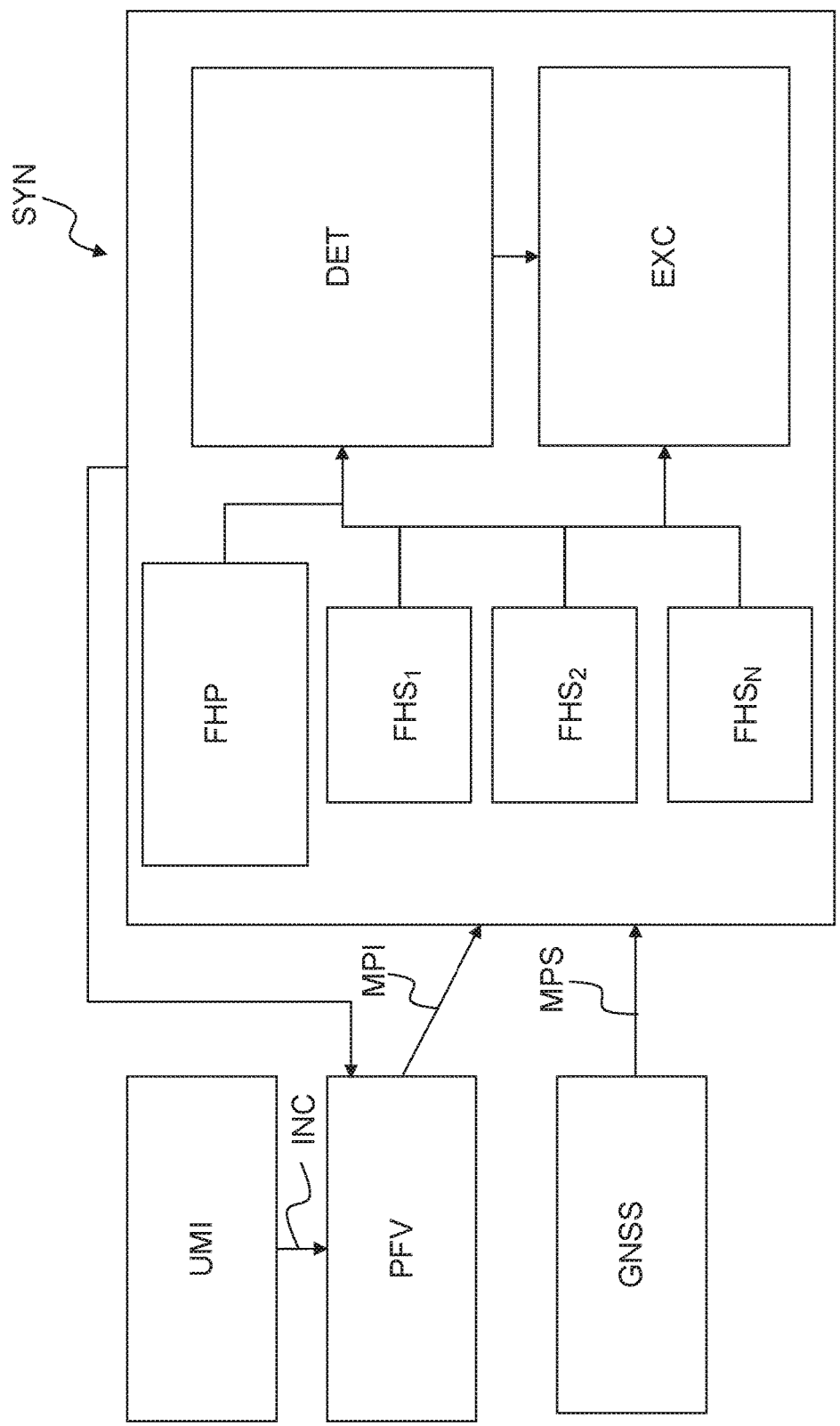
FIG. 1, a hybrid navigation system according to the prior art.

FIG. 1 represents a hybrid navigation system according to the prior art.

This system SYN comprises notably:
- a GNSS satellite-based positioning receiver, receiving signals transmitted by N satellites of a GNSS constellation in visibility and delivering positioning measurements MPS, for example raw pseudo-distance measurements,
- an inertial measurement unit UMI, comprising for example at least one gyrometer and one accelerometer, delivering angle increments and speed increments INC,
- a virtual platform PFV, receiving the angle and speed increments INC and producing inertial positioning measurements MPI, for example measurements of position and/or of speed. Optionally, the virtual platform PFV can also receive measurements of barometric altitude.

The system SYN according to the prior art furthermore comprises a set of hybridization filters, for example implemented in the form of Kalman filters, whose objective is to estimate the errors made in the inertial positioning measurements MPI, on the basis of the complementary information provided by the satellite positioning measurements MPS.

The system SYN comprises for this purpose a main hybridization filter FHP and N secondary hybridization filters $FHS_1, \ldots FHS_N$. The number N of secondary hybridization filters is equal to the number of satellites in visibility. The main hybridization filter FHP receives all the satellite positioning measurements MPS determined on the N signals transmitted by the N satellites and produces a corrected positioning measurement on the basis of a state vector corresponding to the errors of the hybrid system obtained by observing the disparities between the inertial positioning measurements MPI and the satellite positioning measurements MPS. The main hybridization filter FHP also produces a variance/covariance matrix for the estimation error.

The secondary hybridization filters are identical to the main hybridization filter except that they receive as input the satellite positioning measurements MPS corresponding to N−1 signals from among the N available signals. For each secondary hybridization filter, a measurement associated with a different satellite is excluded from the filtering.

The system SYN further comprises a module for detecting a fault of a satellite DET as well as a module for excluding the faulty satellite EXC.

Several fault detection schemes are known from the state of the art. A first scheme consists in comparing the output of the main hybridization filter with each output of the secondary hybridization filters. The comparison can be made by comparing the disparity between the outputs pairwise with a detection threshold calculated on the basis of the variance/covariance matrices provided by the filters. When a detection threshold is exceeded, this signifies that a fault is present on one of the satellites. The detection threshold is configured to obtain a given false alarm probability.

A second scheme, described for example in document [1], consists in monitoring the innovations of all the secondary hybridization filters and in detecting an inconsistent innovation in relation to a predefined model.

When a fault is detected by the detection module DET, the exclusion module EXC is activated so as to identify the defective satellite.

Here again, several prior art schemes exist. Reference [1] describes a first scheme known by the acronym RAIM for "Receiver Autonomous Integrity Monitoring". This first scheme utilizes only the measurements carried out on the satellite signals without using hybridization filters. It requires at least six satellites in visibility. On the basis of several (at least 5) measurements of pseudo-distances as well as associated noise measurements, it is possible to calculate an error residual between the measurements of pseudo-distances and the estimated pseudo-distances. A residual is calculated by removing a satellite each time measurements are obtained. The residual is compared with a detection threshold configured on the basis of the measurement noise. If a single residual does not exceed the detection threshold, it is then possible to identify which satellite is the defective one. It is the satellite which has not been utilized to calculate the residual which does not exceed the detection threshold. This principle is known to a person skilled in the art and is described in numerous works; it is possible also to cite reference [2], in particular on page 43.

A second known exclusion scheme is described in reference [1] for the case of filters for hybridization between GNSS measurements and inertial measurements. It is based, like the detection scheme, on the innovation monitoring of the secondary hybridization filters.

The system of the prior art such as described in FIG. 1 presents notably the drawback of being sensitive to the geometry of the constellation of GNSS satellites. Indeed, in certain configurations, detection and/or exclusion, in case of fault of a satellite, will not be correctly activated. This phenomenon can occur notably when there is little redundancy on an axis, stated otherwise when several satellites are close.

Furthermore, in order to be able to identify the failed satellite, the aforementioned exclusion schemes require at least six satellites in visibility.

Figure 2:
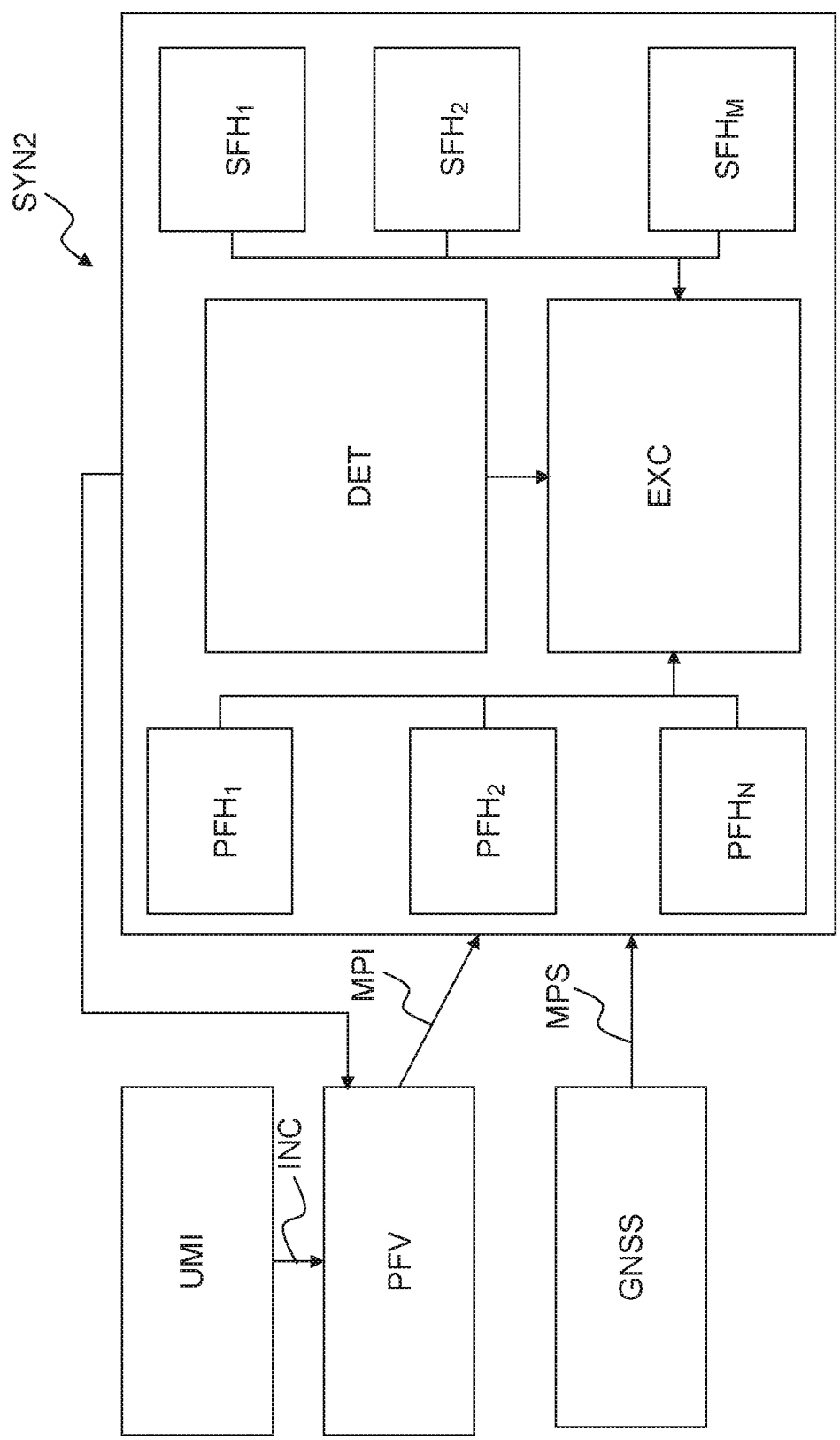
FIG. 2, a hybrid navigation system according to a first embodiment of the invention.

FIG. 2 illustrates a hybrid navigation system SYN2 according to a first embodiment of the invention.

The system SYN2 comprises the same elements as the system SYN according to the prior art described in FIG. 1. It comprises notably a plurality of N first hybridization filters PFH1, PFH2, ... PFHN, the number N being equal to the number of satellites in visibility. The first hybridization filters PFH1, PFH2, ... PFHN receive as input the satellite positioning measurements MPS corresponding to N−1 signals from among the N available signals. For each first hybridization filter, a measurement associated with a different satellite is excluded from the filtering.

The system SYN2 can also comprise, just like the prior art system SYN, a main hybridization filter FHP which can be used, for example, by the detection module DET such as described hereinabove.

The system SYN2 furthermore comprises a plurality of second hybridization filters SFH1, SFH2, ... SFHM. These second filters have a longer updating, or resetting, period than the first hybridization filters PFH1, PFH2, ... PFHN. Typically the first hybridization filters have an updating period of the order of a few seconds while the second hybridization filters have an updating period of the order of a few minutes. The number M of second hybridization filters is a parameter of the invention. It depends notably on the inertial class, that is to say on the precision of the measurements provided by the inertial measurement unit UMI. If the precision is low, a high value is chosen for M.

The second hybridization filters $SFH_1, SFH_2, \ldots SFH_M$ each have an instant of resetting, or updating, that is shifted temporally with respect to the previous filter. For example, the updating period of the filters can be equal to M minutes; the first filter $SFH_1$ is then updated at an instant $t_0$, the second filter $SFH_2$ is updated at an instant $t_0+1$ minute, and the last filter $SFH_M$ is updated at an instant $t_0+(M-1)$ minutes. The instants of updating are expressed modulo M. Preferentially, the shift between two successive updates of two distinct filters is chosen constant. The second hybridization filters $SFH_1$, $SFH_2$, ... $SFH_M$ receive all the satellite positioning measurements MPS determined on the N signals transmitted by the N satellites.

The invention relates to a novel scheme for excluding a failed satellite, this scheme being implemented by the exclusion module EXC. The fault detection scheme is chosen from among the prior art schemes described hereinabove. Preferentially, the detection scheme implemented by the detection module DET is parametrized with a lower false alarm probability than that imposed by the standards, so as to decrease the detection time. The detection module DET is in this case duplicated by a second detection module which executes the same algorithm but with a higher false alarm rate so as to be compatible with the standards and to provide an alert with sufficient reliability.

Figure 3:
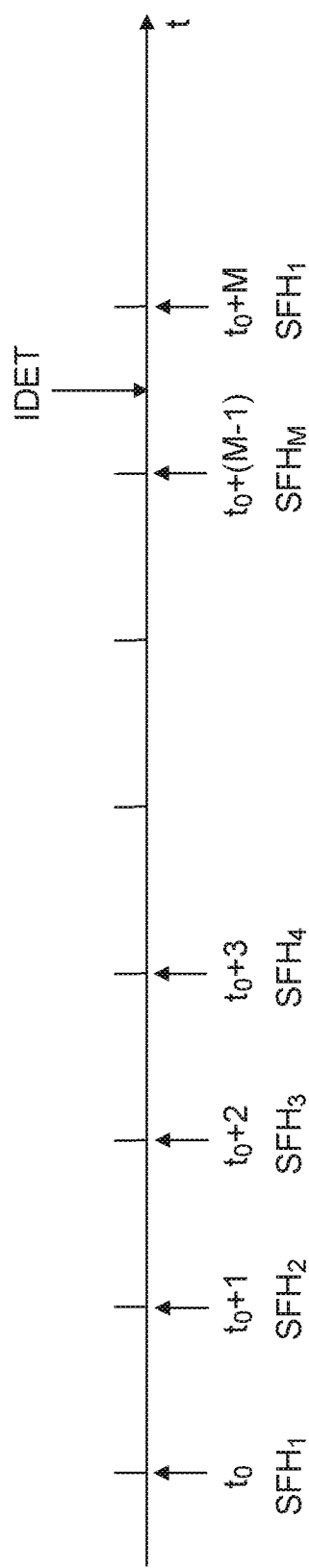
FIG. 3 illustrates on a time axis t the instants of updating of the various hybridization filters, and FIG. 4, a hybrid navigation system according to a second embodiment of the invention.

The scheme for excluding the failed satellite consists thereafter, initially, in selecting the filter, from among the M second hybridization filters $SFH_1$, $SFH_2$, ... $SFH_M$, whose last update is the furthest in time from the instant of detection of the fault. FIG. 3 illustrates on a time axis t the instants of updating of the various hybridization filters $SFH_1$, $SFH_2$, ... $SFH_M$. The first filter $SFH_1$ is updated at $t_0$ and then at $t_0+M$, the second filter $SFH_2$ is updated at $t_0+1$ and then at $t_0+M+1$ and so on and so forth. In FIG. 3 is also represented the instant IDET of detection of the fault by the detection module DET. By comparing this instant IDET with the preceding M instants of updating of the hybridization filters, the filter $SFH_1$ which is the one whose instant of updating is the furthest in time from the instant of detection IDET, is selected. The hybridization filter $SFH_1$ retained is the one whose updating has occurred as long as possible before the detection of the fault of a satellite. The output of this filter therefore corresponds to the measurement most likely to be correct among the outputs of the M secondary filters $SFH_1$, $SFH_2$, ... $SFH_M$. The idea underlying the invention consists in using this measurement as reference measurement. Hereinafter, $SFH_1$ denotes the secondary hybridization filter retained as reference hybridization filter.

Subsequently, the output of the reference hybridization filter $SFH_1$ is compared with each of the outputs of the N first hybridization filters $PFH_1$, $PFH_2$, ... $PFH_N$ so as to deduce therefrom which satellite is defective.

When the output of a first hybridization filter exhibits an appreciable disparity with the output of the reference hybridization filter, this signifies that one of the satellite measurements used as input to the first hybridization filter is defective. By elimination, the defective satellite is identified as that belonging to the intersection of the groups of satellites comprising a defective satellite.

The comparison between the outputs of two hybridization filters can be done in several ways. It can be carried out on a single value or on a vector comprising several values. It can be carried out, for example, by calculating the disparity between the two outputs and by comparing this disparity with a preconfigured detection threshold.

The various hybridization filters used by the system according to the invention are designed according to the general knowledge in the field of hybrid navigation systems. They can for example be embodied by Kalman filters.

Figure 4:
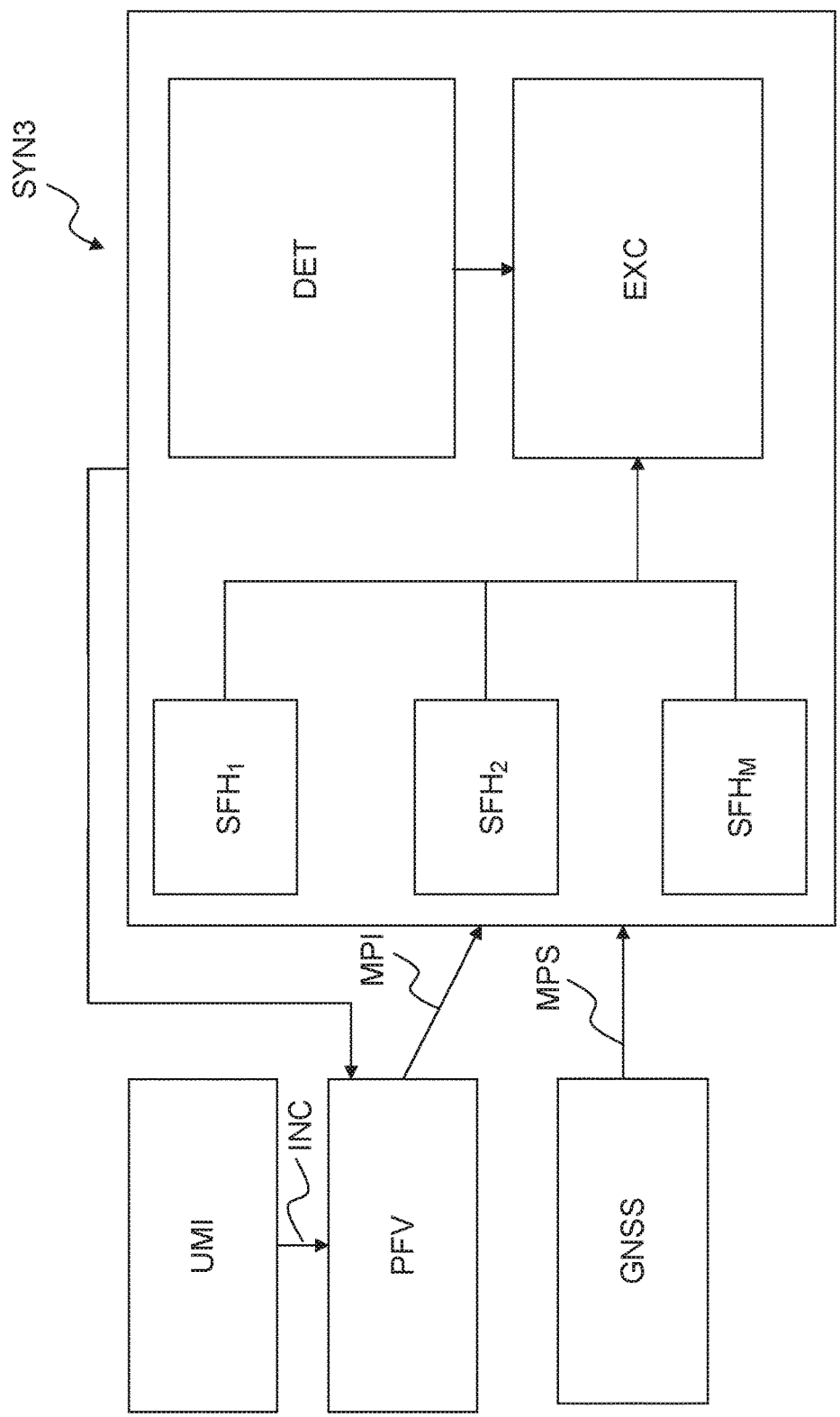

FIG. 4 illustrates a hybrid navigation system SYN3 according to a second embodiment of the invention.

The system SYN3 comprises a GNSS satellite-based positioning receiver, receiving signals transmitted by N satellites of a GNSS constellation in visibility and delivering positioning measurements MPS, for example raw pseudo-distance measurements, an inertial measurement unit UMI and a virtual platform PFV.

The system SYN3 also comprises a fault detection module DET and a fault exclusion module EXC. The fault detection scheme is chosen from among the prior art schemes described hereinabove. Preferentially, the detection scheme implemented by the detection module DET is parametrized with a lower false alarm probability than that imposed by the standards, so as to decrease the detection time.

The system SYN3 furthermore comprises a plurality of hybridization filters $SFH_1$, $SFH_2$, ... $SFH_M$ identical to the M second hybridization filters described in FIG. 2 for the case of the 1$^{st}$ embodiment of the invention.

The use of hybridization filters $SFH_1$, $SFH_2$, ... $SFH_M$ having an instant of updating temporally shifted with respect to one another is an inventive element common to the two embodiments, respectively described in FIGS. 2 and 4, of the invention. In the two embodiments, a reference hybridization filter whose last update is the furthest in time from the instant of detection of the fault is selected, as was described in the case of the first embodiment.

In the second embodiment of the invention, described in FIG. 4, the output of the reference hybridization filter is used to supplement the measurements of pseudo-distances obtained on the signals transmitted by the satellites in visibility belonging to the GNSS constellation.

Accordingly, the prior art scheme known by the acronym RAIM "Receiver Autonomous Integrity Monitoring" such as described, for example on pages 39 to 43 of reference [2], is employed as a basis.

The general principle of the RAIM scheme consists in solving a system of equations obtained by applying the principle of triangulation. The pseudo-distance measured on a satellite signal is linked, by way of an equation, to the coordinates of the receiver device and to the coordinates of the satellite. These latter being known (for example by way of ephemerides), the aforementioned equation then comprises four unknowns which correspond to the three spatial coordinates of the receiver and to a fourth unknown corresponding to the temporal uncertainty related to the desynchronization between the clock of the satellite and the clock of the receiver.

By using at least four measurements of pseudo-distances associated with four distinct satellites, it is possible to solve the system of equations in four unknowns and to deduce therefrom the position of the receiver according to a well known principle.

The RAIM scheme utilizes this principle by introducing, into the aforementioned system of equations, an additional parameter in respect of noise which affects the measurement. This parameter is provided by the receiver.

The system of equations to be solved can be formulated in the following manner:

$$Z_t = h_t(X_t) + \varepsilon_t \qquad (1)$$

$Z_t$ is a vector comprising N measurements of pseudo-distances associated with the N signals received from the N satellites in visibility of the constellation.

$X_t$ is a state vector composed of the quadruplet $(x_t, y_t, z_t, b_{H,t})$ where $(x_t, y_t, z_t)$ are the coordinates of the receiver and $b_{H,t}$ is the bias of the clock of the receiver, with respect to the common clock of the satellites, at the instant t.

$h_t$ is a nonlinear function tying the parameters of the state vector to be estimated to the observed measurements.

$\varepsilon_t$ is a vector containing the N measurement noises assigning the measured pseudo-distances. These noises are provided by the receiver.

The least squares algorithm can be applied to solve the system of equations (1). Indeed, this algorithm makes it possible to estimate unknown parameters on the basis of noisy observations. These observations must depend linearly on the parameters to be estimated. Accordingly, it is necessary beforehand to linearize the system of equations (1) by a first-order expansion. The linearization is done around the previously estimated point, denoted $\hat{X}_{t-1}$.

The linearization to first order of the system (1) is then written:

$$Z_t = h_t(\hat{X}_{t-1}) + H_t(X_t - \hat{X}_{t-1}) + \varepsilon_t \quad (2)$$

$H_t$ is a matrix of dimension N×4 which contains the partial derivatives of $h_t$ with respect to the components of $X_t$ and evaluated at $\hat{X}_{t-1}$. This matrix depends on the relative position of the satellites with respect to the receiver.

Equation (2) can be reformulated in the following manner:

$$Y_t = H_t \delta X_t + \varepsilon_t \quad (3)$$

$Y_t = Z_t - h_t(\hat{X}_{t-1})$ is the measurement vector of the linearized GNSS equation.

$\delta X_t = X_t - \hat{X}_{t-1}$ is the disparity between the state vector at the instant t, $X_t$ is the state vector estimated at the previous instant t−1.

Applying the least squares algorithm to equation (3), the RAIM scheme consists in constructing a vector of residuals, a residual being equal to the difference between an actually observed measurement and a measurement estimated on the basis of the least squares solution.

Reusing the previous notations, the vector of the least squares residuals, denoted $\Delta Y_t$, is expressed as the difference between the measurements actually received and the measurements estimated on the basis of the least squares solution.

$$\Delta Y_t = Y_t - H_t \widehat{\delta X}_t \quad (4)$$

By comparing the sum of the square of the residuals with a preconfigured detection threshold, it is possible to detect a failure of a satellite. The detection threshold is determined for a given false alarm probability and depends on the number of measurements N.

By applying this principle to N estimators each using N−1 satellite measurements and each excluding a different measurement, it is possible to identify the failed satellite measurement. Indeed, if a single estimator does not exceed the failure detection threshold, this signifies that the N−1 measurements used to construct this estimator are healthy and that the failed satellite is at the intersection of the N−1 other groups for which the estimator exceeds the detection threshold.

According to the second embodiment of the invention, the aforementioned RAIM scheme is improved by adding, to the system of equations to be solved, several additional equations linking the pseudo-distance between the receiver and a satellite to the position and clock error measurements provided as output from the reference hybridization filter. The noise information associated with these measurements is provided by the output variance/covariance matrix of the filter.

The reference hybridization filter provides an error vector composed of the position error and clock bias error $\Delta X_{hyb} = (\Delta x\ \Delta y\ \Delta z\ \Delta b)^T$. This vector may comprise solely the measurements of position errors or, as a supplement, an error measurement for the clock bias.

This vector of measurements can be integrated into the system of equations (3) as additional measurements of the error $\delta X_t = X_t - \hat{X}_{t-1}$. In this case the system of equations (3) is increased by $N_{hyb}$ additional equations where $N_{hyb}$ is equal to the number of measurements of the vector $\Delta X_{hyb}$ output by the reference hybridization filter.

The matrix $H_t$ is also modified; it becomes $$H_t = \begin{bmatrix} H_t \\ H_{hyb} \end{bmatrix},$$

with $H_{hyb}$ the identity matrix of size $N_{hyb}$.

The system of equations (3) can be rewritten in the following manner:

$$Y_t = \quad (5)$$

$$Z_t - h_t(\hat{X}_{t-1}) = \begin{bmatrix} PR1 - ht1(\hat{X}_{t-1}) \\ PR2 - ht2(\hat{X}_{t-1}) \\ \cdots \\ PRN - htN(\hat{X}_{t-1}) \\ \Delta x - 0 \\ \Delta y - 0 \\ \Delta z - 0 \\ \Delta b - 0 \end{bmatrix} = \begin{bmatrix} \Delta PR1 \\ \Delta PR2 \\ \cdots \\ \Delta PRN \\ \Delta x \\ \Delta y \\ \Delta z \\ \Delta b \end{bmatrix} = \begin{bmatrix} H_t \\ H_{hyb} \end{bmatrix} \delta X_t + \varepsilon_t$$

PR1, PR2, . . . PRN are the measurements of pseudo-distances carried out on the N satellite signals received.

Adding the additional measurements $\Delta x\ \Delta y\ \Delta z\ \Delta b$ gives an item of information on all the axes (by virtue of the three coordinates of the receiver) and according to the direction of the clock bias and thus makes it possible to compensate for a poor geometric configuration of the satellites.

Furthermore, adding three or four additional measurements to the system of equations to be solved makes it possible to correspondingly decrease the number of satellites in visibility required in order to solve the system.

A variant embodiment of the first or of the second embodiment of the invention, making it possible to improve the reliability of the measurements provided by the reference hybridization filter, is now described.

In parallel with or prior to the implementation of a scheme for excluding a satellite defect according to the first or the second embodiment of the invention, it is possible to apply an exclusion algorithm of the RAIM type which exhibits the advantage of being able to validate alongside the processing the satellite measurements which seem healthy.

Specifically, according to the RAIM scheme, if the residual calculated for a group of N−1 satellite measurements exceeds the detection threshold, this signifies that one of the N−1 measurements is defective and conversely that the $N^{th}$ measurement not utilized in this group can be considered to be healthy.

Thus, the measurement not used by a group of N−1 measurements whose residual exceeds the defect detection threshold can be used by priority by the hybridization filters from among which the reference hybridization filter is selected.

An advantage of this variant is that it makes it possible to further improve the precision of the measurements delivered by the reference hybridization filter since it uses by priority satellite measurements which are likely to be healthy since they are identified as such by the RAIM scheme. Thus the uncertainty associated with these measurements is decreased.

Another advantage of this variant embodiment of the invention relates to the calculation of the protection radius HEL ("Horizontal Exclusion Limit"). This protection radius defines a positioning error bound that the system may not exceed without succeeding in correcting the positioning failure with a given non-detection and false alarm probability.

This radius guarantees that the fault will be excluded before the aeroplane exits the protection circle defined by this radius.

The protection radius HEL is a commonly used quantity in the field of aeronautical navigation systems.

Its precise calculation in the case of a fault exclusion scheme of RAIM type is for example described on pages 44 to 46 of reference [2].

This calculation is based on the sum of the squared residuals provided by solving in the least squares sense the modified equation system (2) with the additional measurements provided by the reference hybridization filter. The sum of the squared residuals, in the presence of a fault, constitutes a non-central chi2 statistical law with N−5 degrees of freedom where N is the number of equations of the system (2). The smallest detectable non-centrality parameter of this chi2 law is calculable on the basis of a false alarm probability and of a non-detection probability.

It is calculated on the basis of the assumption that the probability (according to the non-central chi2 law) that the sum of the squared residuals does not exceed the detection threshold although the fault is present is less than the non-detection probability.

The smallest non-centrality parameter makes it possible to derive the smallest satellite bias detectable on the basis of the projection equations. The smallest detectable bias makes it possible to derive the error caused by the smallest detectable bias.

For each sub-group k comprising N−1 satellites, the impact on the position error of the smallest detectable bias is calculated, N−1 protection radii RPi (i varying from 1 to N−1) are then obtained, and the maximum among them, denoted HILk, is then taken. The maximum out of all the radii HILk by varying k from 1 to N gives the protection radius HEL sought.

The protection radius HEL can be calculated before the mission in a predictive manner since it depends only on the noise, the probabilities and the geometry of the measurements.

The advantage of the second embodiment of the invention is that it makes it possible to apply a calculation of protection radius HEL identical to that of the RAIM scheme but with better performance, stated otherwise increased precision.

REFERENCES

[1] "Fault Detection and exclusion using normalized solution separation and residual monitoring methods", Ryan S. Y. Young, Gary A. McGraw; and

[2] "Algorithmes de contrÔle d'intégrité pour la navigation hybride GNSS et systems de navigation inertielle en presence de multiples mesures satellitaires défaillantes" [Integrity monitoring algorithms for GNSS hybrid navigation and inertial navigation systems in the presence of multiple failed satellite measurements], Frédéric Faurie, thesis, university of Bordeaux.

What is claimed is:

1. A navigation system comprising:
a satellite-based positioning receiver able to deliver measurements of pseudo-distances or of positioning on the basis of signals transmitted by satellites belonging to a constellation of a satellite-based positioning system;
an inertial measurement unit configured to deliver inertial positioning measurements; and
the navigation system configured to exclude a failed satellite measurement in said satellite-based positioning system, comprising:
a plurality N of first hybridization filters each receiving at least one satellite positioning measurement carried out on the signals received from all the satellites in visibility of the system with the exception of one satellite, different for each different first hybridization filter, and an inertial positioning measurement and delivering a corrected positioning measurement, the so-called hybrid measurement;
a plurality M of second hybridization filters each receiving at least one satellite positioning measurement carried out on the signals received from all the satellites in visibility of the system and an inertial positioning measurement (MPI) and delivering a corrected positioning measurement, called the hybrid measurement, the second hybridization filters being updated, at a constant temporal rate, successively at periodically shifted temporal instants;
a detection module coupled to the plurality of first hybridization filters and configured to detect an error in a satellite positioning measurement and to deliver an instant of detection of a failure of at least one satellite positioning measurement; and
an exclusion module configured to exclude the failed satellite positioning measurement configured to:
select the oldest hybrid measurement, with respect to the instant of detection of a failure, from among the M hybrid measurements to date delivered by the M second hybridization filters;
compare the selected hybrid measurement, called the reference hybrid measurement, with each of the hybrid measurements delivered by the N first hybridization filters;
determine therefrom an identification of the failed measurement; and
exclude the identified failed measurement.

2. The navigation system of claim 1, in which the exclusion module is further configured to:
apply a statistical test of the "RAIM" type to a set of measurements comprising the satellite measurements carried out on the signals received from all the satellites in visibility with the exception of one satellite, the statistical test being dependent on the error between each measurement of the set and an estimate of each of these measurements;
detect the presence of the failed satellite measurement from among the satellite measurements of the set as a function of the statistical test; and
inject, at the successive periodically shifted temporal instants, as input to the M second hybridization filters, by priority the satellite measurements not belonging to a set in which the presence of a failed measurement has been detected.

3. The navigation system of claim 1, in which the exclusion module is further configured to:
  compare the difference between the reference hybrid measurement and each of the hybrid measurements delivered by the N first hybridization filters with a predetermined detection threshold;
  conclude on the presence of a failed measurement from among the group of N−1 measurements used by the first hybridization filters for which the difference is greater than the predetermined detection threshold; and
  identify the failed measurement as that belonging to an intersection of the groups of N−1 measurements comprising the failed measurement.

4. The navigation system of claim 1, in which the updating period of a first hybridization filter is less than the updating period of a second hybridization filter.

5. The navigation system of claim 1, in which the duration between two successive temporal instants of updating of two distinct second hybridization filters is substantially equal to the updating period of a second hybridization filter divided by the number M of second hybridization filters.

6. The navigation system of claim 1, in which a hybridization filter is a Kalman filter.

7. A navigation system comprising:
  a satellite-based positioning receiver configured to deliver measurements of pseudo-distances or of positioning on the basis of signals transmitted by satellites belonging to a constellation of a satellite-based positioning system;
  an inertial measurement unit configured for delivering inertial positioning measurements; and
    the navigation system configured to exclude a failed satellite measurement in the satellite-based positioning system comprising:
  a plurality M of hybridization filters each configured to receive at least one measurement carried out on the signals received from all the satellites in visibility of the system and an inertial positioning measurement and delivering a corrected positioning measurement, called the hybrid measurement, the hybridization filters being updated, at a constant temporal rate, successively at periodically shifted temporal instants;
  a detection module coupled to the plurality of first hybridization filters and configured to detect an error in a satellite positioning measurement and to deliver an instant of detection of a failure of at least one satellite positioning measurement; and
  an exclusion module configured to exclude the failed satellite positioning measurement, the exclusion module configured to:
    select the hybrid measurement, called a reference hybrid measurement, which is the oldest with respect to the instant of detection of a failure, from among the M hybrid measurements to date delivered by the M hybridization filters;
    apply a statistical test of the "RAIM" type to a set of measurements comprising on the one hand the satellite measurements carried out on the signals received from all the satellites in visibility with the exception of one satellite and on the other hand the reference hybrid measurement, the statistical test being dependent on the error between each measurement of the said set and an estimate of each of these measurements;
    detect the presence of a defective satellite measurement from among the satellite measurements of the said set as a function of the said statistical test;
    repeat the previous two steps while modifying at each repetition the satellite measurement excluded from the said set;
    determine therefrom an identification of the failed satellite measurement; and
    exclude the identified failed measurement.

8. The navigation system of claim 7, in which the exclusion module is further configured to:
  apply a statistical test of the "RAIM" type to a set of measurements comprising the satellite measurements carried out on the signals received from all the satellites in visibility with the exception of one satellite, the statistical test being dependent on the error between each measurement of the set and an estimate of each of these measurements;
  detect the presence of a defective satellite measurement from among the satellite measurements of the set as a function of the said statistical test; and
  inject, at the successive periodically shifted temporal instants, as input to the M hybridization filters, by priority the satellite measurements not belonging to a set in which the presence of a defective measurement has been detected.

9. The navigation system of claim 7, in which the statistical test comprises:
  forming a system of equations linking on the one hand the satellite measurements of the set to the coordinates of the position of the system and on the other hand the reference hybrid measurement to the coordinates of the position of the system;
  constructing a vector of residuals by applying the least squares algorithm to the system of equations;
  constructing a single residual on the basis of the vector of residuals; and
  comparing the single residual with a predetermined detection threshold.

10. The navigation system of claim 7, in which the reference hybrid measurement comprises a position measurement of the system and a measurement of clock bias between a satellite and the system.

11. The navigation system of claim 7, in which the set of measurements to which the statistical test is applied furthermore comprises the measurement noise impacting the reference hybrid measurement, which is provided by the hybridization filter that delivered the hybrid measurement.

* * * * *